(12) United States Patent
Oshima et al.

(10) Patent No.: US 11,175,428 B2
(45) Date of Patent: Nov. 16, 2021

(54) METALLIC FOREIGN OBJECT DETECTOR, WIRELESS POWER TRANSMITTING DEVICE, WIRELESS POWER RECEIVING DEVICE, AND WIRELESS POWER TRANSMISSION SYSTEM

(71) Applicant: TDK CORPORATION, Tokyo (JP)

(72) Inventors: Kazunori Oshima, Tokyo (JP); Akira Gotani, Tokyo (JP); Kazuki Kondo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 141 days.

(21) Appl. No.: 16/489,184

(22) PCT Filed: May 29, 2018

(86) PCT No.: PCT/JP2018/020508
§ 371 (c)(1),
(2) Date: Aug. 27, 2019

(87) PCT Pub. No.: WO2018/235540
PCT Pub. Date: Dec. 27, 2018

(65) Prior Publication Data
US 2020/0012007 A1 Jan. 9, 2020

(30) Foreign Application Priority Data
Jun. 20, 2017 (JP) .............................. JP2017-120109

(51) Int. Cl.
*G01V 3/10* (2006.01)
*H02J 5/00* (2016.01)
(Continued)

(52) U.S. Cl.
CPC ................ *G01V 3/10* (2013.01); *H02J 5/005* (2013.01); *H02J 50/60* (2016.02); *H02J 50/80* (2016.02)

(58) Field of Classification Search
CPC .. G01V 3/10; H02J 50/80; H02J 50/60; H02J 50/70; H02J 5/005; H02J 50/12;
(Continued)

(56) References Cited

U.S. PATENT DOCUMENTS 9,476,736 B2 * 10/2016 Arisawa .................. H02J 7/025
2013/0162054 A1    6/2013 Komiyama
(Continued)

FOREIGN PATENT DOCUMENTS

JP    2013-132133 A    7/2013
JP    2016-007117 A    1/2016

OTHER PUBLICATIONS

International Search Report issued in corresponding International Patent Application No. PCT/JP2018/020508, dated Aug. 14, 2018, with English translation.

*Primary Examiner* — Lee E Rodak
(74) *Attorney, Agent, or Firm* — McDermott Will & Emery LLP

(57) ABSTRACT

A metallic foreign object detector is used in a wireless power transmission system that transmits power by wireless from a feeding coil to a receiving coil and includes an antenna coil, a capacitor that forms a resonance circuit together with the antenna coil, a vibration detection circuit configured to detect generation of a vibration signal in the resonance circuit, and a determination circuit that detects the presence/absence of a metallic foreign object according to the vibration signal. The vibration detection circuit is configured to output a detection state signal indicating the detection state of generation of the vibration signal. The determination circuit is configured to execute an operation of detecting the presence/absence of a metallic foreign object according to the detection state signal.

14 Claims, 12 Drawing Sheets

(51) Int. Cl.
*H02J 50/80* (2016.01)
*H02J 50/60* (2016.01)

(58) Field of Classification Search
CPC .. H02J 7/025; H02J 50/10; H02J 50/90; H02J 50/40; H02J 7/0029; H02J 50/50; H02J 7/00; H02J 17/00; H02J 7/00045; H02J 50/00; H02J 7/0047; H01F 38/14; H01F 27/28; H01F 27/38; Y02T 90/14; Y02T 10/7072; Y02T 10/70; Y02T 90/12; B60L 53/12; B60L 2210/30; B60L 2270/147; B60L 53/124; B60L 53/122; B60L 53/126; B60L 2210/40; B60L 11/182; H04B 5/0037; H04B 5/00; H04B 5/0043; H04B 5/0075

See application file for complete search history.

(56) References Cited

U.S. PATENT DOCUMENTS

| | | | |
|---|---|---|---|
| 2015/0028875 A1* | 1/2015 | Irie | H02J 50/12 324/345 |
| 2015/0349541 A1* | 12/2015 | Yamamoto | H02J 50/60 307/104 |
| 2015/0349543 A1 | 12/2015 | Sakata et al. | |
| 2016/0064952 A1* | 3/2016 | Matsumoto | H02J 50/40 307/104 |
| 2017/0179772 A1* | 6/2017 | Asanuma | H02J 7/00034 |

\* cited by examiner

METALLIC FOREIGN OBJECT DETECTOR, WIRELESS POWER TRANSMITTING DEVICE, WIRELESS POWER RECEIVING DEVICE, AND WIRELESS POWER TRANSMISSION SYSTEM

CROSS REFERENCE

This application is the U.S. National Phase under 35 US.C. § 371 of International Application No. PCT/JP2018/020508, filed on May 29, 2018, which claims the benefit of Japanese Application No. 2017-120109, filed on Jun. 20, 2017, the entire contents of each are hereby incorporated by reference.

TECHNICAL FIELD

The present invention relates to a metallic foreign object detector, a wireless power transmitting device, a wireless power receiving device, and a wireless power transmission system.

BACKGROUND ART

A wireless power transmission system that transmits power by wireless from a feeding coil to a receiving coil without using a power cable is now attracting attention.

When a metallic foreign object is present between a feeding coil and a receiving coil which are magnetically coupled to each other in a wireless power transmission system, eddy current may be caused to flow in the metallic foreign object by magnetic flux to generate heat. Therefore, a mechanism for detecting a metallic foreign object present between the feeding and receiving coils is necessitated.

The above mechanism includes a known system which uses a detection coil. For example, Patent Document 1 discloses a detector that detects a metallic foreign object by applying pulses to a Q-value measurement coil and calculating a Q-value from the amplitude value and time information of a response waveform of the pulses.

CITATION LIST

Patent Document

[Patent Document 1] JP 2013-132133 A

SUMMARY OF INVENTION

Technical Problem to be Solved by Invention

However, in the above detection coil, resonance may be generated not only by the applied pulses, but also by a high-frequency component (specifically, switching noise of a power transmitting device) superimposed on magnetic flux generated from a feeding coil. When a vibration signal generated by the high-frequency component is superimposed on a vibration signal generated in the detection coil by the pulses, distortion occurs in the response waveform to make it difficult to accurately determine the presence/absence of the metallic foreign object, thus requiring improvement.

The present invention has been made in view of the above problem, and the object thereof is to accurately detect a metallic foreign object present between the feeding and receiving coils even during power transmission.

Means for Solving the Problem

A metallic foreign object detector according to the present invention is used in a wireless power transmission system that transmits power by wireless from a feeding coil to a receiving coil and includes an antenna coil, a capacitor that forms a resonance circuit together with the antenna coil, a vibration detection circuit configured to detect generation of a vibration signal in the resonance circuit, and a determination circuit that detects the presence/absence of a metallic foreign object on the basis of the vibration signal. The vibration detection circuit is configured to output a detection state signal indicating a detection state of generation of the vibration signal. The determination circuit is configured to execute an operation of detecting the presence/absence of a metallic foreign object according to the detection state signal.

According to the present invention, when the vibration signal is unintentionally generated in the resonance circuit by a high-frequency component superimposed on magnetic flux generated from the feeding coil, detection of a metallic foreign object can be performed using the unintentionally generated vibration signal with pulse application for intentionally generating the vibration signal stopped. This can prevent the vibration signal generated by a high-frequency component from being superimposed on the vibration signal generated in the detection coil by the applied pulse, so that it is possible to accurately detect a metallic foreign object present between the feeding coil and the receiving coil even during power transmission.

In the above metallic foreign object detector, the vibration detection circuit may be configured to activate the detection state signal when voltage appearing in the resonance circuit exceeds a first threshold value, and the determination circuit may be configured to execute an operation of detecting the presence/absence of a metallic foreign object in response to activation of the detection state signal. With this configuration, only when a vibration signal having an amplitude large enough to perform the metallic foreign object detection is generated, the determination circuit is allowed to detect a metallic foreign object using the generated vibration signal.

In each of the above metallic foreign object detectors, the detection state signal may be a signal that indicates the number of waves of the vibration signal represented by the number of times that the voltage appearing in the resonance circuit exceeds a second threshold value, and the determination circuit may be configured to execute an operation of detecting the presence/absence of a metallic foreign object when the number of waves indicated by the detection state signal becomes equal to or larger than a third threshold value. With this configuration, only when a vibration signal having an amplitude large enough to perform the metallic foreign object detection is generated, the determination circuit is allowed to detect a metallic foreign object using the generated vibration signal.

Each of the above metallic foreign object detectors may further include a drive circuit that applies voltage to the resonance circuit to generate the vibration signal in the resonance circuit. With this configuration, even when a vibration signal having an amplitude large enough to perform the metallic foreign object detection is not generated, detection of a metallic foreign object can be performed.

Each of the above metallic foreign object detectors may further include a switch inserted between the drive circuit and the resonance circuit, and the determination circuit may include a drive control part that generates a switch drive signal for controlling open/close of the switch, and the drive control part may control the switch drive signal so as to keep the switch open when the detection state signal indicates that the vibration detection circuit has detected generation of the vibration signal. With this configuration, when foreign object detection can be performed without intentionally applying voltage to the resonance circuit, application of voltage to the resonance circuit can be stopped.

Each of the above metallic foreign object detectors may further include a timer circuit that activates a clocking result signal at a period corresponding to the frequency of the output voltage of a switching circuit that applies voltage to the feeding coil, and the drive control part may control the switch drive signal so as to close the switch in response to activation of the clocking result signal when the detection state signal indicates that the vibration detection circuit has not detected generation of the vibration signal after previous activation of the clocking result signal. With this configuration, when a vibration signal having an amplitude large enough to perform the metallic foreign object detection is not generated, the vibration signal can intentionally be generated by the drive circuit.

In each of the above metallic foreign object detectors, the drive control part may control the switch drive signal so as to close the switch when the wireless power transmission system stops its operation or performs low power transmission. This allows the drive control part to intentionally generate the vibration signal using the drive circuit when a vibration signal large enough to perform the metallic foreign object detection is not generated by a high-frequency component superimposed on magnetic flux generated from the feeding coil due to the operation stop of the wireless power transmission system or a low power transmission state thereof.

Each of the above metallic foreign object detectors may further include a switch inserted between the drive circuit and the resonance circuit and a timer circuit that activates a clocking result signal at a period corresponding to the frequency of the output voltage of a switching circuit that applies voltage to the feeding coil, the determination circuit may include a drive control part that generates a switch drive signal for controlling open/close of the switch, and the drive control part may control the switch drive signal so as to close the switch in response to activation of the clocking result signal when the detection state signal indicates that the vibration detection circuit has not detected generation of the vibration signal after previous activation of the clocking result signal. With this configuration, when a vibration signal having an amplitude large enough to perform the metallic foreign object detection is not generated, the vibration signal can intentionally be generated by the drive circuit.

Each of the above metallic foreign object detectors may further include a switch inserted between the drive circuit and the resonance circuit, the determination circuit may include a drive control part that generates a switch drive signal for controlling open/close of the switch, and the drive control part may control the switch drive signal so as to close the switch when the wireless power transmission system stops its operation or performs low power transmission. This allows the drive control part to intentionally generate the vibration signal using the drive circuit when a vibration signal large enough to perform the metallic foreign object detection is not generated by a high-frequency component superimposed on magnetic flux generated from the feeding coil due to the operation stop of the wireless power transmission system or a low power transmission state thereof.

In each of the above metallic foreign object detectors, the foreign object detection circuit may be configured to detect the presence/absence of a metallic foreign object based on a change in a vibration time length representing the length of time required for vibration of the vibration signal corresponding to a predetermined number of waves larger than 1. With this configuration, even when a vibration signal having an undetermined amplitude like the vibration signal unintentionally generated in the resonance circuit by a high-frequency component superimposed on magnetic flux generated from the feeding coil is used, it is possible to optimally execute the metallic foreign object detection.

A wireless power transmitting device according to the present invention includes the feeding coil and the metallic foreign object detector as claimed in any one of claims 1 to 10. With this configuration, it is possible to obtain a wireless power transmitting device capable of accurately detecting a metallic foreign object present between the feeding coil and the receiving coil even during power transmission.

A wireless power receiving device according to the present invention includes the receiving coil and the metallic foreign object detector as claimed in any one of claims 1 to 10. With this configuration, it is possible to obtain a wireless power receiving device capable of accurately detecting a metallic foreign object present between the feeding coil and the receiving coil even during power transmission.

A wireless power transmission system according to the present invention includes a wireless power transmitting device having the feeding coil and a wireless power receiving device having the receiving coil. At least one of the wireless power transmitting device and wireless power receiving device includes the metallic foreign object detector as claimed in any one of claims 1 to 10. With this configuration, it is possible to obtain a wireless power transmission system capable of accurately detecting a metallic foreign object present between the feeding coil and the receiving coil even during power transmission.

Advantageous Effects of the Invention

According to the present invention, it is possible to accurately detect a metallic foreign object present between the feeding coil and the receiving coil even during power transmission.

MODES FOR CARRYING OUT THE INVENTION

Figure 1:
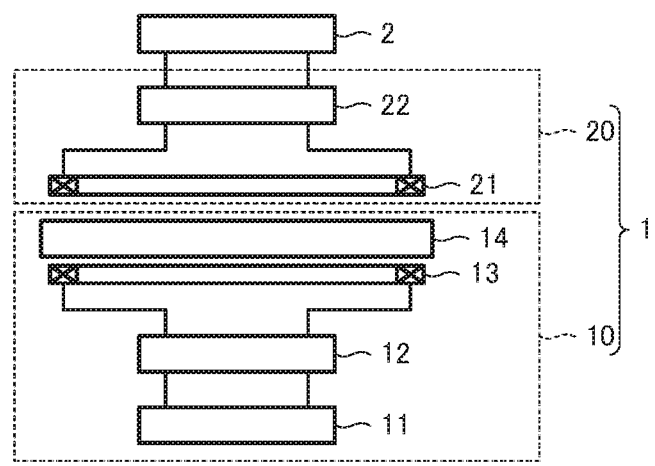
FIG. 1 is a view illustrating the schematic configuration of a wireless power transmission system 1 according to a first embodiment of the present invention and a load 2 connected to the wireless power transmission system 1.

Hereinafter, embodiments of the present invention will be described in detail with reference to the accompanying drawings. It should be noted that the present invention is not limited by the contents described in the following embodiments. Further, constituent elements of the following embodiments include those that will readily occur to the skilled in the art, and include those substantially identical or equivalent to those of the skilled in the art. Furthermore, in the following description, the same reference numerals are given to the same parts or parts having the same function, and repeated description will be omitted.

FIG. 1 is a view illustrating the schematic configuration of a wireless power transmission system 1 according to a first embodiment of the present invention and a load 2 connected to the wireless power transmission system 1. The wireless power transmission system 1 includes a wireless power transmitting device 10 and a wireless power receiving device 20. The load 2 is connected to the wireless power receiving device 20.

The wireless power transmission system 1 is a system used for power supply to a moving body such as an EV (Electric Vehicle) or an HV (Hybrid Vehicle) that use power of a secondary battery. In this case, the wireless power transmitting device 10 is mounted in power supply equipment disposed on the ground, and the wireless power receiving device 20 is mounted in a vehicle body. Hereinafter, it is assumed that the wireless power transmission system 1 is a system for power supply to the EV.

Figure 2:
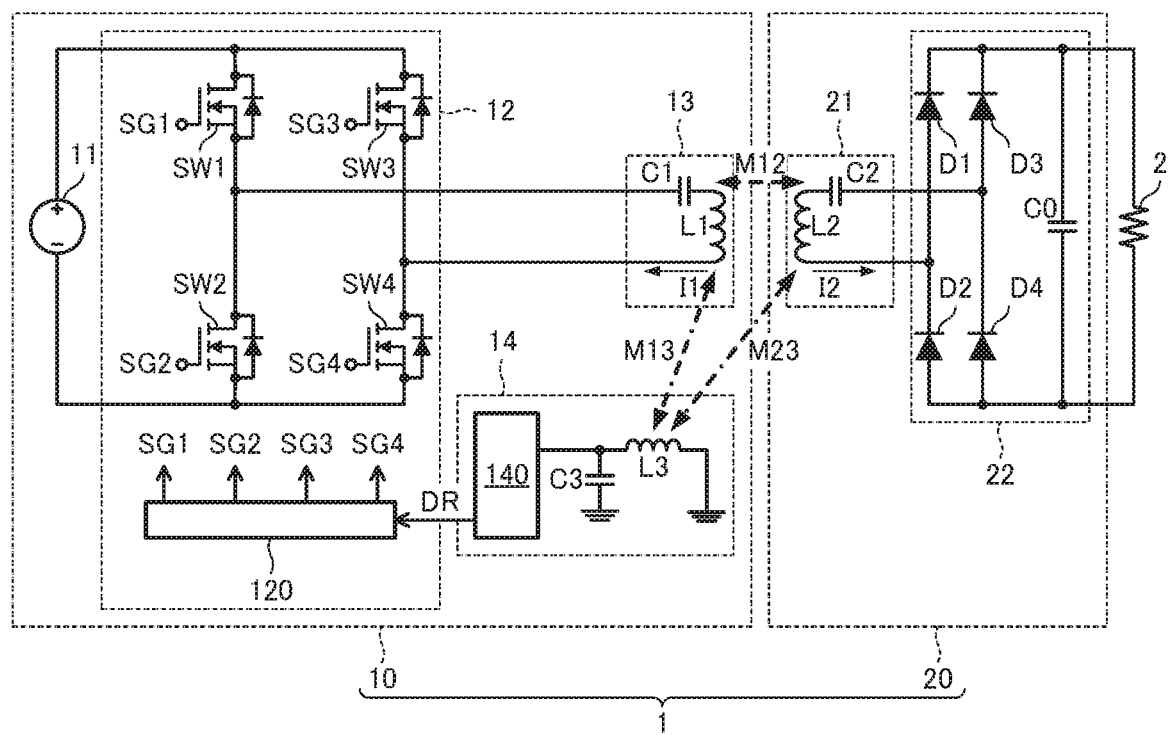
FIG. 2 is a view illustrating the internal circuit configuration of a wireless power transmitting device 10 and that of a wireless power receiving device 20.

FIG. 2 is a view illustrating the internal circuit configuration of the wireless power transmitting device 10 and that of the wireless power receiving device 20. With reference to FIGS. 1 and 2, the outline of the configuration of the wireless power transmission system 1 will be described first, followed by detailed description of the characteristic configuration of the present invention.

As illustrated in FIGS. 1 and 2, the wireless power transmitting device 10 includes a DC power supply 11, a power converter 12, a feeding coil part 13, and a metallic foreign object detector 14. Although the metallic foreign object detector 14 is provided in the wireless power transmitting device 10 in the present embodiment, it may be provided in the wireless power receiving device 20.

The DC power supply 11 plays a role of supplying DC power to the power converter 12. The DC power supply 11 is not particularly limited in type as long as it can supply DC power. For example, a DC power supply that outputs power obtained by rectifying and smoothing commercial AC power, a secondary battery, a DC power supply that outputs power by way of photovoltaic power generation, or a switching power supply such as a switching converter can be suitably used as the DC power supply 11.

The power converter 12 is an inverter that converts the DC power supplied from the DC power supply 11 into AC power and supplies AC current I1 illustrated in FIG. 2 to the feeding coil part 13. Specifically, as illustrated in FIG. 2, the power converter 12 is constituted of a switching circuit (full-bridge circuit) having a plurality of bridge-connected switching elements SW1 to SW4 and a switch drive circuit 120. Although the switching circuit in the power converter 12 is constituted of the full-bridge circuit in this example, switching circuits of other types may be used.

The switching elements SW1 to SW4 are turned ON/OFF independently of each other according to control signals SG1 to SG4 supplied from the switch drive circuit 120 to the gate of each of the switching elements SW1 to SW4. Specific examples of the switching elements SW1 to SW4 suitably include a MOSFET (Metal Oxide Semiconductor Field Effect Transistor) and an IGBT (Insulated Gate Bipolar Transistor).

The switch drive circuit 120 serves as a signal generation part that generates the control signals SG1 to SG4 such that the output voltage of the switching circuit constituted of the switching elements SW1 to SW4 becomes AC voltage of a predetermined frequency. Accordingly, the AC voltage of a predetermined frequency is supplied to a feeding coil L1 to be described later. Hereinafter, the predetermined frequency is referred to as "power transmission frequency fp". The specific value of the power transmission frequency fp is, e.g., 20 [kHz] to 200 [kHz].

As illustrated in FIG. 2, the feeding coil part 13 is a resonance circuit constituted of a feeding side capacitor C1 and a feeding coil L1 which are connected in series and plays a role of generating an alternating magnetic field based on the AC voltage supplied from the power converter 12. The resonance frequency of the resonance circuit constituting the feeding coil part 13 is set equal to or close to the above-mentioned power transmission frequency fp. The feeding side capacitor C1 may be connected in parallel to the feeding coil L1.

The feeding coil L1 is a spiral structure coil formed by planarly winding, by about several turns to about several tens of turns, a litz wire obtained by twisting about two thousand insulated copper wires each having a diameter of Φ0.1 (mm), for example, and is disposed, e.g., in or near the ground. When AC voltage is supplied from the power converter 12 to the feeding coil L1, the AC current I1 illustrated in FIG. 2 flows in the feeding coil L1, whereby the alternating magnetic field is generated. The alternating magnetic field causes an electromotive force to be generated in a receiving coil L2 to be described later by a mutual inductance M12 between the feeding coil L1 and the receiving coil L2, whereby power transmission is achieved.

The metallic foreign object detector 14 is a device having a function of detecting the presence/absence of a metallic foreign object approaching the feeding coil L1 and includes a resonance circuit (resonance circuit RC illustrated in FIG. 4) including an antenna coil L3 and a capacitor C3 and a detection part 140 connected to the resonance circuit, as illustrated in FIG. 2. One ends of the respective antenna coil L3 and capacitor C3 are grounded, and the other ends thereof are connected in common to the detection part 140.

The metallic foreign object detector 14 is provided for the purpose of detecting a metallic foreign object present between the feeding coil L1 and the receiving coil L2. Thus, as illustrated in FIG. 1, at least a part (specifically, antenna coil L3) of the metallic foreign object detector 14 is disposed between the feeding coil L1 and the receiving coil L2. The metallic foreign object detector 14 and the feeding coil L1 may be formed as an integrated unit or as separate units.

The metallic foreign object detector 14 may include a plurality of antenna coils L3. In this case, the capacitor C3 may be provided for each antenna coil L3.

Figure 3A:
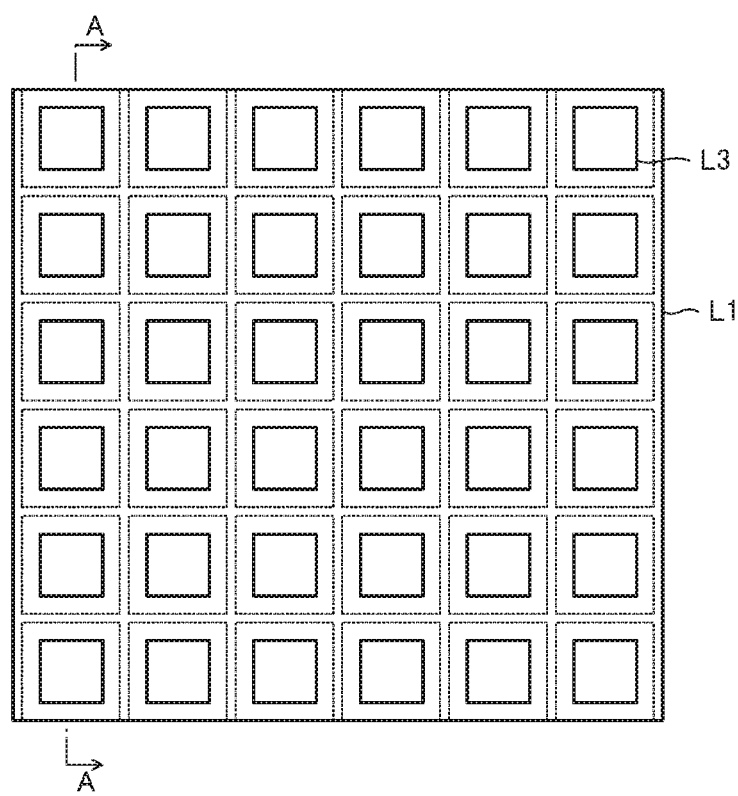
FIG. 3A is a plan view illustrating the positional relationship between a feeding coil L1 and antenna coils L3 when a metallic foreign object detector 14 includes the plurality of antenna coils L3.
Figure 3B:
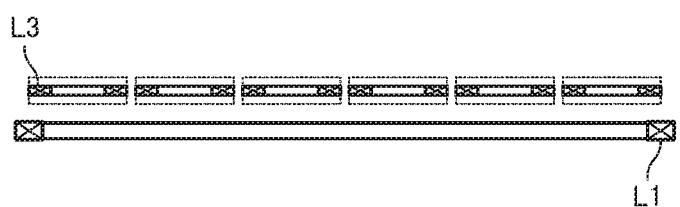
FIG. 3B is a cross-sectional view of the feeding coil L1 and antenna coils L3 taken along line A-A in FIG. 3A.

FIG. 3A is a plan view illustrating the positional relationship between the feeding coil L1 and the antenna coils L3 when the metallic foreign object detector 14 includes the plurality of antenna coils L3 and FIG. 3B is a cross-sectional view of the feeding coil L1 and antenna coils 3 taken along line A-A in FIG. 3A. As illustrated, as viewed from above, the plurality of antenna coils L3 are arranged in a matrix within an area corresponding to the inside of the feeding coil L1. Such arrangement of the antenna coils L3 can be realized by placing, on the feeding coil L1, a printed board (not illustrated) on the surface of which a conductive coil pattern is formed.

Referring back to FIG. 2, the detection part 140 is configured to detect the presence/absence of a metallic foreign object according to a change in a drive signal appearing in the resonance circuit constituted of the antenna coil L3 and capacitor C3 and to generate a control signal DR for controlling the operation of the switch drive circuit 120 on the basis of the detection result. The control signal DR generated by the detection part 140 is supplied to the switch drive circuit 120 as illustrated in FIG. 2.

The control signal DR indicates an instruction of operation stop when the metallic foreign object is detected, while it indicates an instruction of operation continuation when the metallic foreign object is not detected. When receiving the control signal DR indicating the operation stop, the switch drive circuit 120 turns OFF all the switching elements SW1 to SW4 to prevent the above-mentioned alternating magnetic field from being generated. This prevents generation of abnormal heat or the like. On the other hand, when receiving the control signal DR indicating the operation continuation, the switch drive circuit 120 continues generating the control signals SG1 to SG4 for making the switching circuit constituted of the switching elements SW1 to SW4 output AC voltage of the power transmission frequency fp. Accordingly, the alternating magnetic field is also continuously generated.

As illustrated in FIGS. 1 and 2, the wireless power receiving device 20 includes a receiving coil part 21 and a rectifier 22.

As illustrated in FIG. 2, the receiving coil part 21 includes a resonance circuit constituted of a receiving side capacitor C2 and a receiving coil L2 which are connected in series and plays a role as a power receiving part that receives AC power transmitted from the feeding coil L1 by wireless. The resonance frequency of the receiving side resonance circuit constituting the receiving coil part 21 is also set to a frequency equal to or close to the above-mentioned power transmission frequency fp. The receiving side capacitor C2 may be connected in parallel to the receiving coil L2.

Like the feeding coil L1, the receiving coil L2 is a spiral structure coil formed by planarly winding, by about several turns to about several tens of turns, a litz wire obtained by twisting about two thousand insulated copper wires each having a diameter of Φ0.1 (mm), for example. On the other hand, the mounting position of the receiving coil L2 differs from that of the feeding coil L1 and, for example, the receiving coil L2 is mounted to the lower portion of the body of an electric vehicle. When magnetic flux generate by the feeding coil L1 interlinks the receiving coil L2, electromotive force by electromagnetic induction is generated in the receiving coil L2, whereby AC current I2 illustrated in FIG. 2 flows in the receiving coil L2. The AC current I2 is converted into DC current by the rectifier 22 and is then supplied to the load 2. Thus, DC power can be supplied to the load 2.

The rectifier 22 is a circuit that rectifies the AC current output from the receiving coil part 21 into DC current to supply DC power to the load 2. Specifically, as illustrated in FIG. 2, the rectifier 22 includes a bridge circuit including four bridge-connected diodes D1 to D4 and a smoothing capacitor C0 connected in parallel to the bridge circuit.

The load 2 includes a charger and a battery which are not illustrated. The charger is a circuit that charges the battery according to the DC power output from the rectifier 22. The charging is executed by, e.g., constant-voltage/constant-current charging (CVCC charging). The battery is not particularly limited in type as long as it can store power. For example, a secondary battery (lithium-ion battery, a lithium-polymer battery, a nickel battery, etc.) and a capacitive element (electric double-layer capacitor, etc.) can be suitably used as the battery constituting the load 2.

The following specifically describes the metallic foreign object detector 14. First, with reference to FIGS. 11 and 12, the metallic foreign object detector 14 as the background art of the present invention will be described, followed by description of the metallic foreign object detector 14 according to the present embodiment with reference to FIGS. 4 to 7. The following background art itself is invented by the present inventors and is not known at the time of application of the present invention.

Figure 11:
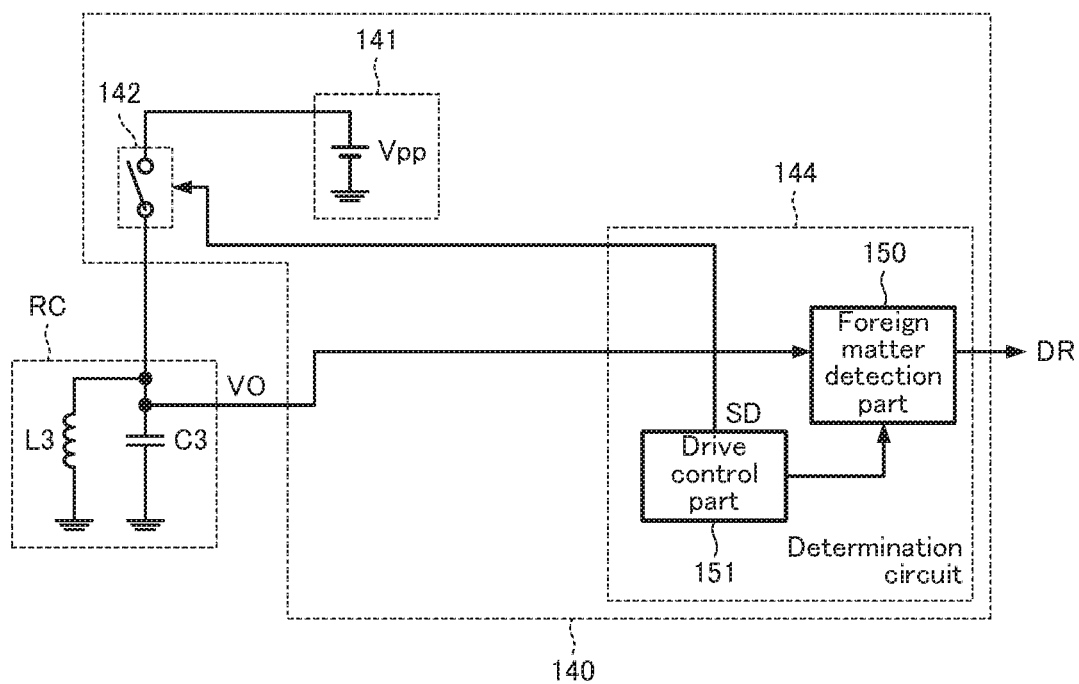
FIG. 11 is a schematic block diagram illustrating the functional block of the detection part 140 included in the metallic foreign object detector 14 according to the background art of the present invention.

FIG. 11 is a schematic block diagram illustrating the functional block of the detection part 140 included in the metallic foreign object detector 14 according to the background art of the present invention. As illustrated in FIG. 11, the detection part 140 according to the background art of the present invention includes a drive circuit 141, a switch 142, and a determination circuit 144.

The drive circuit 141 is a circuit that applies voltage Vpp to the resonance circuit RC constituted of the antenna coil L3 and capacitor C3 to induce a vibration signal in the resonance circuit RC. Specifically, as illustrated in FIG. 11, the drive circuit 141 is constituted by a power supply circuit of the voltage Vpp.

The switch 142 is a switch inserted between the drive circuit 141 and the resonance circuit RC and is opened or closed in response to a switch drive signal SD supplied from the determination circuit 144. When the switch 142 is closed, the voltage Vpp is supplied from the drive circuit 141 to the resonance circuit RC, with the result that output voltage VO (voltage appearing at a connection point between the antenna coil L3 and the capacitor C3) of the resonance circuit RC becomes equal to the voltage Vpp. Thereafter, when the switch 142 is opened, supply of the voltage Vpp to the resonance circuit RC is stopped to generate a vibration signal in the resonance circuit RC. The frequency of the vibration signal is equal to the resonance frequency of the resonance circuit RC.

The determination circuit 144 is a circuit that executes a detection operation of a metallic foreign object based on the vibration signal appearing in the output voltage VO of the resonance circuit RC and functionally includes a foreign object detection part 150 and a drive control part 151. The determination circuit 144 is, e.g., an MCU (Micro Control Unit).

Figure 12:
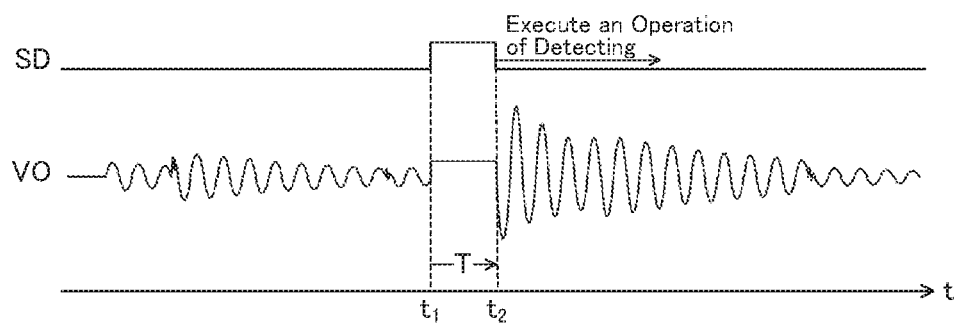
FIG. 12 is a view illustrating temporal changes in a plurality of signals concerning the operation of the metallic foreign object detector 14 according to the background art of the present invention.

FIG. 12 is a view illustrating temporal changes in a plurality of signals concerning the operation of the metallic foreign object detector 14 according to the background art of the present invention. Hereinafter, with reference also to FIG. 12, the functions of the foreign object detection part 150 and drive control part 151 constituting the determination circuit 144 will be described.

The drive control part 151 is a circuit that generates the switch drive signal SD for controlling open/close of the switch 142. The switch drive signal SD is a binary signal assuming a value of either High or Low, and the switch 142 is opened when the switch drive signal SD is Low and closed when the switch drive signal SD is High.

As illustrated in FIG. 12, the switch drive signal SD is initially Low. The drive control part 151 controls the switch drive signal SD to High at time $t_1$ and controls the same to Low at time $t_2$ that corresponds to a predetermined time T elapsed from the time $t_1$. As a result, the switch 142 is closed during the time T between the time $t_1$ and time $t_2$, whereby the voltage Vpp is supplied from the drive circuit 141 to the resonance circuit RC. This corresponds to pulse application to the resonance circuit RC.

When the supply of the voltage Vpp from the drive circuit 141 to the resonance circuit RC is stopped at time $t_2$, the vibration signal as illustrated in FIG. 12 appears in the output voltage VO by the energy of voltage Vpp that has been applied. The drive control part 151 controls the foreign object detection part 150 to start an operation of detecting the presence/absence of a metallic foreign object at time $t_2$ when the pulse application is ended. According to this control, the foreign object detection part 150 starts the operation of detecting the presence/absence of a metallic foreign object using the vibration signal. As a result, the detection of the presence/absence of a metallic foreign object using the vibration signal generated by the pulse application is achieved. Further details of the operation of the foreign object detection part 150 will be described later.

A vibration signal may be generated in the output voltage VO even without the pulse application, as illustrated in FIG. 12. This is mainly due to switching noise of the switching circuit in the power converter 12. More specifically, the alternating magnetic field generated between the feeding coil L1 and the receiving coil L2 contains a high-frequency component due to switching noise of the switching circuit in the power converter 12, and the high-frequency component generates an electromotive force in the antenna coil L3 through mutual inductances M13 and M23 (see FIG. 2) respectively between the antenna coil L3 and the feeding coil L1 and between the antenna coil L3 and the receiving coil L2. This electromotive force generates a vibration signal in the output voltage VO.

When such a vibration signal derived from noise is superimposed on the vibration signal generated by the pulse application, distortion occurs in a response waveform to make it difficult to accurately determine the presence/absence of a metallic foreign object, as described above. To solve this problem, the metallic foreign object detector 14 according to the present embodiment uses the vibration signal derived from noise in place of the applied pulses to detect the presence/absence of a metallic foreign object when the amplitude of the vibration signal derived from noise is sufficiently large. Hereinafter, the configuration and operation of the metallic foreign object detector 14 according to the present embodiment will be described in detail.

Figure 4A:
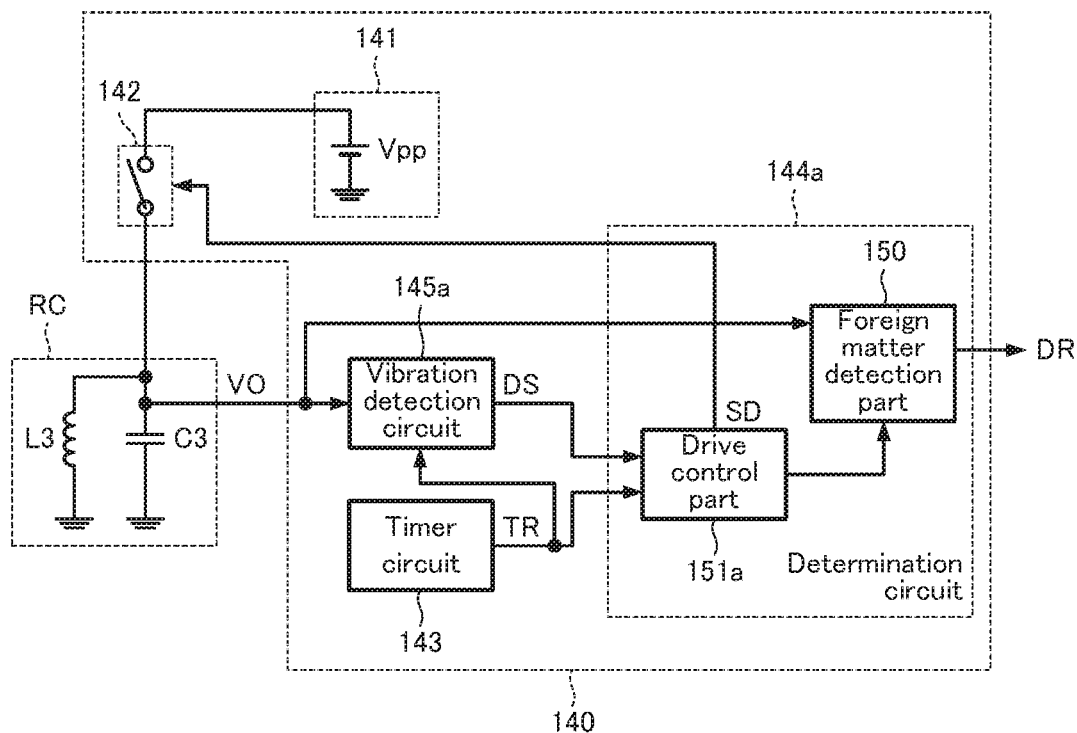
FIG. 4A is a schematic block diagram illustrating the functional block of a detection part 140 included in the metallic foreign object detector 14 according to the first embodiment of the present invention[A.

FIG. 4A is a schematic block diagram illustrating the functional block of the detection part 140 included in the metallic foreign object detector 14 according to the present embodiment. As illustrated, the detection part 140 according to the present embodiment includes a drive circuit 141, a switch 142, a timer circuit 143, a determination circuit 144a, and a vibration detection circuit 145a. The drive circuit 141 and switch 142 have the same configurations as those described with reference to FIG. 11, so overlapping description will be omitted.

The timer circuit 143 is a circuit corresponding to the above power transmission frequency fp (frequency of the output voltage of the switching circuit in the power converter 12) and is configured to activate a clocking result signal TR which is a pulse signal with a period (=1/fp) of the power transmission frequency fp. The clocking result signal TR output from the timer circuit 143 is supplied to the determination circuit 144a and vibration detection circuit 145a.

The vibration detection circuit 145a is a circuit configured to detect generation of the vibration signal in the resonance circuit RC and outputs a detection state signal DS that indicates the detection state of generation of the vibration signal. The detection state signal DS in the present embodiment is a binary signal assuming a value of either High or Low. The vibration detection circuit 145a is configured to activate the detection state signal DS to High when the output voltage VO of the resonance circuit RC exceeds a predetermined threshold value (first threshold value TH1 to be described later).

Figure 4B:
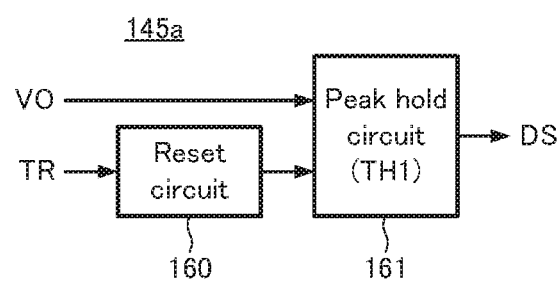
FIG. 4B is a view illustrating the internal circuit of a vibration detection circuit 145a illustrated in FIG. 4A.

FIG. 4B is a view illustrating the internal circuit of the vibration detection circuit 145a. As illustrated, the vibration detection circuit 145a includes a reset circuit 160 and a peak hold circuit 161.

The peak hold circuit 161 is a circuit that generates the detection state signal DS from the output voltage VO. Specifically, when the value of the output voltage VO exceeds the first threshold value TH1, the peak hold circuit 161 activates the detection state signal DS to High and keeps the High state, while it makes the detection state signal DS Low upon receiving the control of the reset circuit 160. The first threshold value TH1 is a fixed value and is set in advance in the peak hold circuit 161.

The reset circuit 160 is a circuit that resets the detection state signal DS to Low according to the clocking result signal TR supplied from the timer circuit 143. Specifically, the reset circuit 160 controls the peak hold circuit 161 to make the detection state signal DS Low when the clocking result signal TR is activated to High.

Referring back to FIG. 4A, the determination circuit 144a differs from the determination circuit 144 illustrated in FIG. 11 in that it has a drive control part 151a in place of the drive control part 151 illustrated in FIG. 11 and executes an operation of detecting the presence/absence of a metallic foreign object according to the detection state signal DS output from a vibration detection circuit 145b. Other configurations are the same as those of the determination circuit 144, so the following description will be made focusing the points different from the determination circuit 144.

The drive control part 151a generates the switch drive signal SD for controlling open/close of the switch 142 in the same way as the drive control part 151; however, a specific method of generating the switch drive signal SD is different.

Specifically, when the detection state signal DS indicates that the vibration detection circuit 145a has detected generation of the vibration signal, the drive control part 151a controls the switch drive signal SD so as to keep the switch 142 open, while when the detection state signal DS indicates that the vibration detection circuit 145a has not detected generation of the vibration signal after the previous activation of the clocking result signal TR configured to be periodically activated, the drive control part 151a controls the switch drive signal SD to close the switch 142 in response to the activation of the clocking result signal TR. In the present embodiment, the case where "the detection state signal DS indicates that the vibration detection circuit 145a has detected generation of the vibration signal" corresponds to a case where the detection state signal DS is activated.

Further, the drive control part 151a is configured to make the foreign object detection part 150 start an operation of detecting the presence/absence of a metallic foreign object not only at the time when the pulse application is ended, but also at the time when the detection state signal DS is activated.

Figure 5A:
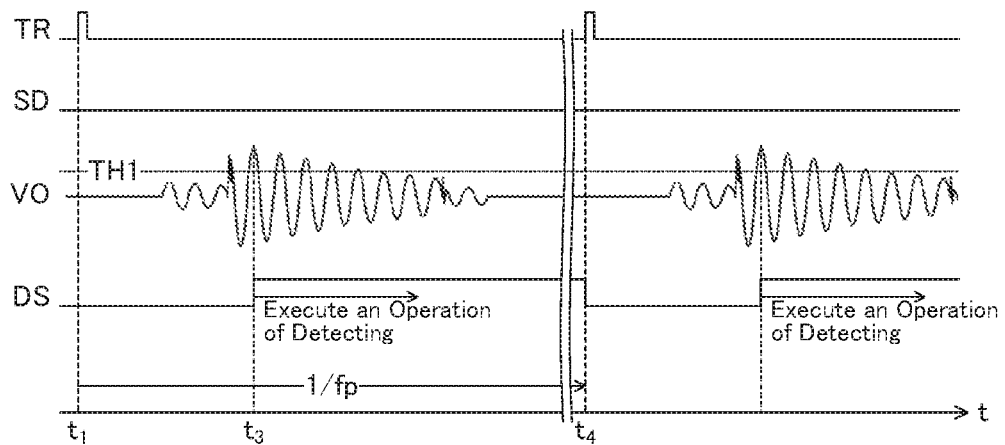
FIGS. 5A and 5B are views illustrating temporal changes in a clocking result signal TR, a switch drive signal SD, an output voltage VO, and a detection state signal DS in the first embodiment of the present invention.
Figure 5B:
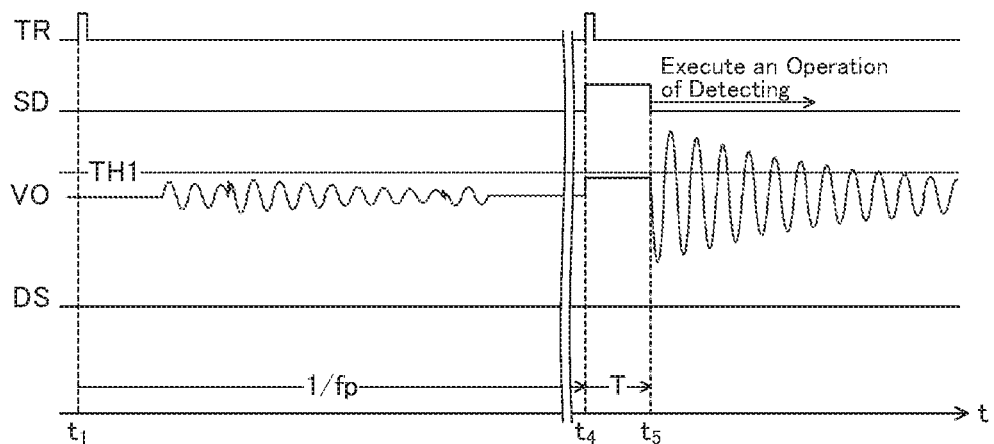

FIG. 5 is a view illustrating temporal changes in the clocking result signal TR, switch drive signal SD, output voltage VO, and detection state signal DS. FIG. 5A illustrates a case where a large vibration signal is being generated in the output voltage VO by switching noise of the switching circuit in the power converter 12, and FIG. 5B illustrates a case where a large vibration signal is not being generated in the output voltage VO. Hereinafter, with reference to FIG. 5, the operation of the drive control part 151a will be described in greater detail.

After the clocking result signal TR is activated at time $t_1$, the drive control part 151a starts monitoring the detection state signal DS supplied from the vibration detection circuit 145a. Thereafter, in the example of FIG. 5A, the value of the output voltage VO exceeds the first threshold value TH1 at time $t_3$ before time $t_4$ ($=t_1+1/fp$) at which the clocking result signal TR is activated next. In response to this, the vibration detection circuit 145a activates the detection state signal DS to High at time $t_3$. Then, in response to the activation of the detection state signal DS, the drive control part 151a controls the foreign object detection part 150 to start an operation of detecting the presence/absence of a metallic foreign object. Upon receiving the control, the foreign object detection part 150 starts the operation of detecting the presence/absence of a metallic foreign object. The vibration signal used in this detection operation is generated not by the voltage Vpp (i.e., applied pulses) supplied from the drive circuit 141 to the resonance circuit RC, but by switching noise of the switching circuit in the power converter 12.

On the other hand, in the example of FIG. 5B, the value of the output voltage VO does not exceed the first threshold value TH1 between time $t_1$ and time $t_4$. In this case, in response to activation of the clocking result signal TR at time $t_4$, the drive control part 151a controls the switch drive signal SD to High so as to close the switch 142. Then, the drive control part 151a controls the switch drive signal SD to Low so as to open the switch 142 at time $t_5$ that corresponds to a predetermined time T elapsed from time $t_4$. As a result, the voltage Vpp is supplied from the drive circuit 141 to the resonance circuit RC over the time T between time $t_4$ and time $t_5$. This corresponds to pulse application to the resonance circuit RC. The drive control part 151a controls the foreign object detection part 150 to start an operation of detecting the presence/absence of a metallic foreign object at time t5 at which the pulse application is ended. Upon receiving the control, the foreign object detection part 150 starts the operation of detecting the presence/absence of a metallic foreign object. The vibration signal used in this detection operation is generated by the voltage Vpp (i.e., applied pulses) supplied from the drive circuit 141 to the resonance circuit RC, as in the case of the background art.

Figure 6:
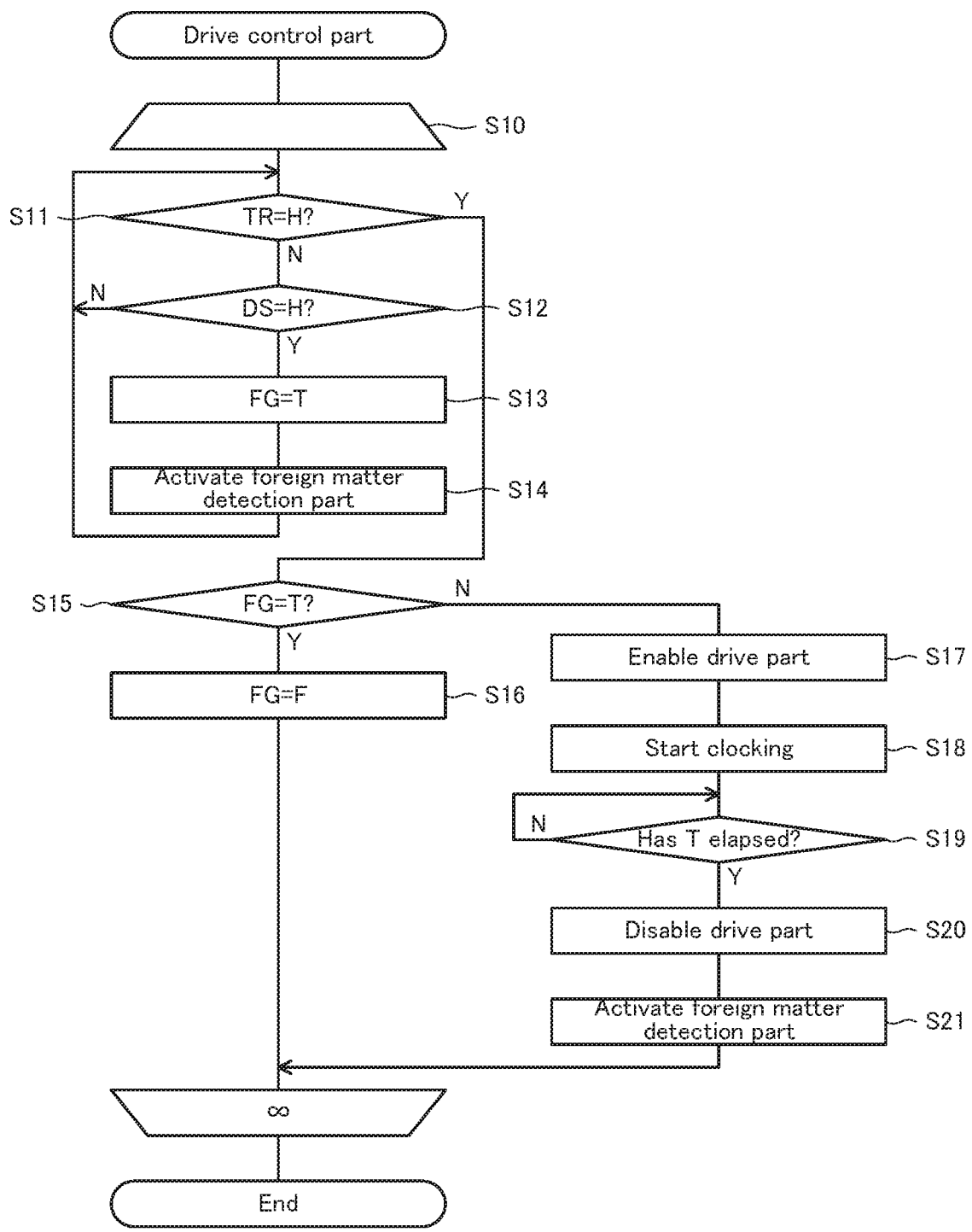
FIG. 6 is a flowchart illustrating the processing performed by a drive control part 151a illustrated in FIG. 4A.

FIG. 6 is a flowchart illustrating the processing performed by the drive control part 151a. Hereinafter, with reference to FIG. 6, the operation of the drive control part 151a will be described in greater detail.

As illustrated in FIG. 6, the drive control part 151a is configured to repeat the processing of step S11 to step S21 (step S10).

In the repetitive processing, the drive control part 151a first determines whether or not the clocking result signal TR is High (step S11). When the clocking result signal TR is not High, the drive control part 151a then determines whether or not the detection state signal DS is High (step S12). When the detection state signal DS is also not High, the drive control part 151a returns to step S11 and repeats the determination of the clocking result signal TR.

When determining in step S12 that the detection state signal DS is High, the drive control part 151a sets T (true) in an internal flag FG (step S13) and activates the foreign object detection part 150 (step S14). As a result, the foreign object detection part 150 executes an operation of detecting the presence/absence of a metallic foreign object based on the vibration signal generated by switching noise or the like of the switching circuit in the power converter 12. After activating the foreign object detection part 150 in step S14, the drive control part 151a returns to step S11.

When determining in step S11 that the clocking result signal TR is High, the drive control part 151a determines whether or not the internal flag FG is T (true) (step S15). When determining that the internal flag FG is T (true), the drive control part 151a sets F (false) in the internal flag FG and returns to step S11. This corresponds to the cancellation of pulse application.

On the other hand, when determining in step S15 that the internal flag FG is not T (true), the drive control part 151a uses the switch drive signal SD to close the switch 142 to enable the drive circuit 141 (step S17) and starts clocking (step S18). Then, the drive control part 151a repeatedly determines whether or not the predetermined time T has elapsed (step S19). Then, when determining that the predetermined time T has elapsed, the drive control part 151a uses the switch drive signal SD to open the switch 142 to disable the drive circuit 141 (step S20) and activates the foreign object detection part 150 (step S21). As a result, the foreign object detection part 150 executes an operation of detecting the presence/absence of a metallic foreign object based on the vibration signal generated by application of the voltage Vpp. After activating the foreign object detection part 150 in step S21, the drive control part 151a returns to step S11.

The operation of the drive control part 151a has been described in detail. Next, the operation of the foreign object detection part 150 will specifically be described with reference to FIG. 7.

Figure 7:
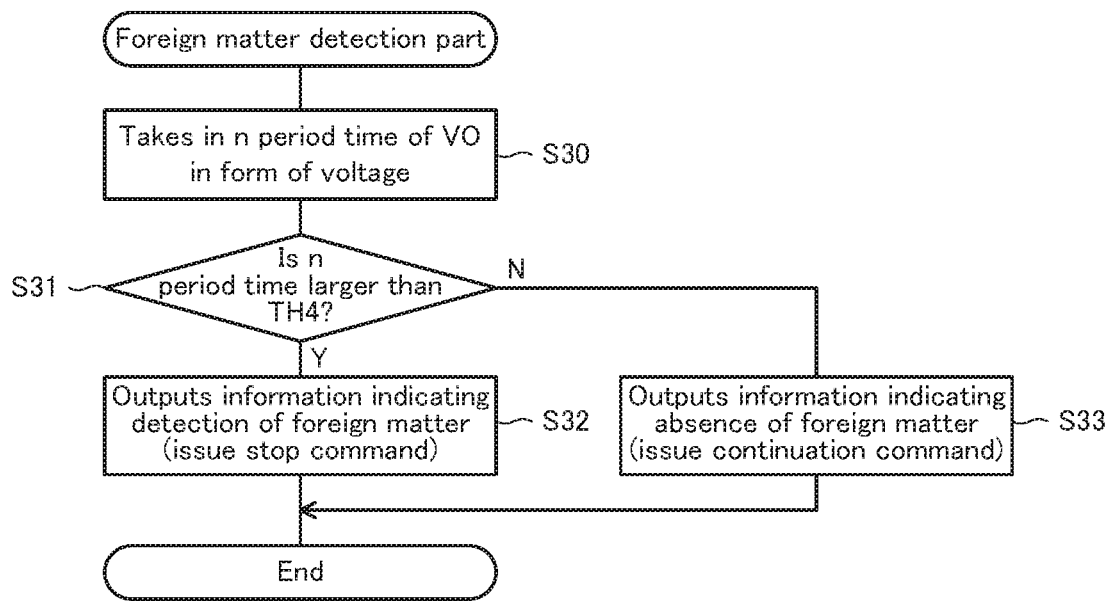
FIG. 7 is a flowchart illustrating the processing performed by a foreign object detection part 150 illustrated in FIG. 4A.

FIG. 7 is a flowchart illustrating the processing performed by the foreign object detection part 150. As illustrated, when activated by the drive control part 151a, the foreign object detection part 150 first measures n period time of the output voltage VO (time length required for the output voltage VO to vibrate n times: vibration time length representing the length of time required for the vibration of the vibration signal corresponding to a predetermined number of waves larger than 1) and takes in a result of the measurement in the form of voltage (step S30). Subsequently, the foreign object detection part 150 determines whether or not the taken-in n period time is larger than a previously stored fourth threshold value TH4 (step S31). When determining that the n period time is larger than the fourth threshold value TH4, the foreign object detection part 150 outputs information indicating that a metallic foreign object has been detected (step S32), while when determining that the n period time is not larger than the fourth threshold value TH4, the foreign object detection part 150 outputs information indicating that a metallic foreign object has not been detected (step S33).

The thus output information is used for generating the control signal DR described with reference to FIG. 2. Specifically, when the foreign object detection part 150 outputs the information indicating that it has detected a metallic foreign object, the detection part 140 generates the control signal DR indicating an instruction of operation stop and supplies it to the switch drive circuit 120. On the other hand, when the foreign object detection part 150 outputs the information indicating that it has not detected a metallic foreign object, the detection part 140 generates the control signal DR indicating an instruction of operation continuation and supplies it to the switch drive circuit 120. The operation of the switch drive circuit 120 receiving the control signal DR (instruction of operation stop or operation continuation) is as described above.

As described above, according to the metallic foreign object detector 14 of the present embodiment, when the vibration signal is unintentionally generated by a high-frequency component superimposed on magnetic flux generated from the feeding coil L1, detection of a metallic foreign object can be performed using the unintentionally generated vibration signal with pulse application for intentionally generating the vibration signal stopped. This can prevent the vibration signal generated by a high-frequency component from being superimposed on the vibration signal generated in the antenna coil L3 by the applied pulse, so that it is possible to accurately detect a metallic foreign object present between the feeding coil L1 and the receiving coil L2 even during power transmission.

Further, the vibration detection circuit 145*a* is configured to activate the detection state signal DS when the output voltage VO exceeds the first threshold value TH1, and the determination circuit 144*a* is configured to execute an operation of detecting the presence/absence of a metallic foreign object in response to the activation of the detection state signal DS, so that only when a vibration signal having an amplitude large enough to perform the metallic foreign object detection is generated, the determination circuit 144*a* is allowed to detect a metallic foreign object using the generated vibration signal.

Further, the drive circuit 141 that generates the vibration signal in the resonance circuit RC by application of the voltage Vpp is provided, so that even when the vibration signal generated by switching noise or the like of the switching circuit in the power converter 12 does not have an amplitude large enough to perform the metallic foreign object detection, the metallic foreign object detection can be performed.

Further, when the vibration detection circuit 145*a* detects generation of the vibration signal (that is, when the determination result in step S15 illustrated in FIG. 6 is affirmative), the drive control part 151*a* keeps the switch 142 open until the next activation of the clocking result signal TR, so that when the foreign object detection can be performed without intentionally applying the voltage Vpp to the resonance circuit RC, the application of voltage Vpp to the resonance circuit RC can be stopped.

Further, when the vibration detection circuit 145*a* has not detected generation of the vibration signal (that is, the determination result in step S15 illustrated in FIG. 6 is negative) after the previous activation of the clocking result signal TR, the drive control part 151*a* closes the switch 142 in response to the activation of the clocking result signal TR, so that when a vibration signal large enough to perform the metallic foreign object detection is not generated, the vibration signal can intentionally be generated in the output voltage VO by the drive circuit 141.

Further, the foreign object detection part 150 is configured to detect the presence/absence of a metallic foreign object according to a change in the n period time of the output voltage VO, so that even when a vibration signal having an undetermined amplitude like the vibration signal unintentionally generated in the resonance circuit RC by switching noise of the switching circuit in the power converter 12 is used, it is possible to optimally execute the metallic foreign object detection.

Figure 8A:
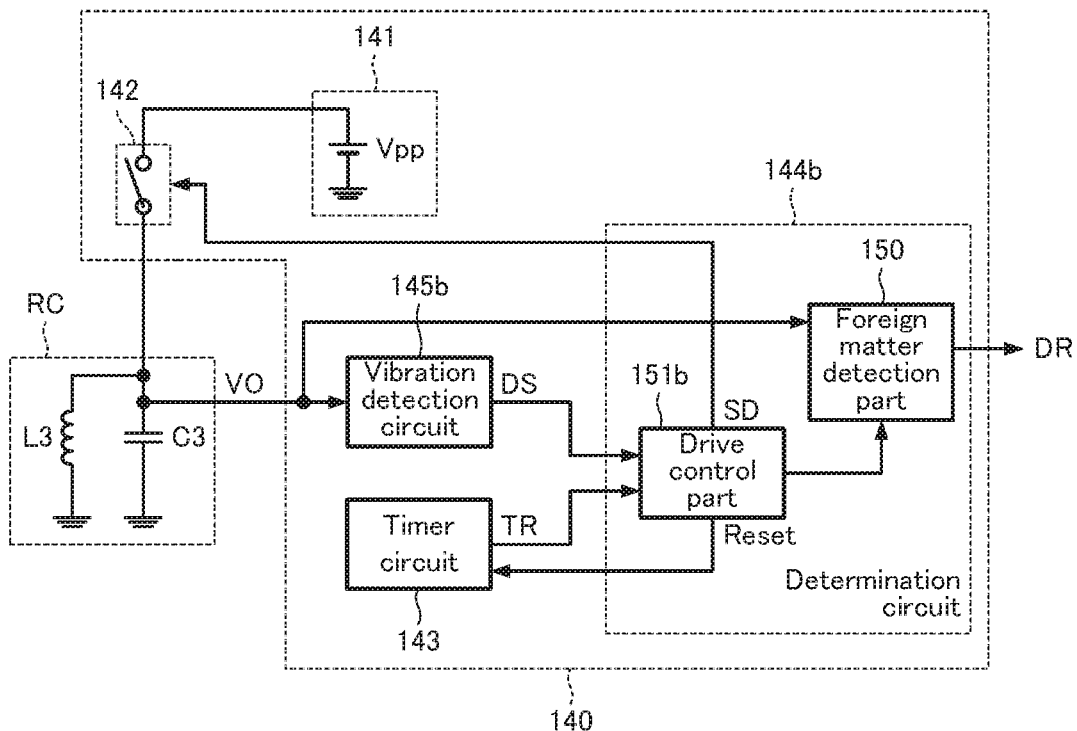
FIG. 8A is a schematic block diagram illustrating the functional block of the detection part 140 included in the metallic foreign object detector 14 according to a second embodiment of the present invention.

FIG. 8A is a schematic block diagram illustrating the functional block of the detection part 140 included in the metallic foreign object detector 14 according to a second embodiment of the present invention. As illustrated, the detection part 140 according to the present embodiment includes a determination circuit 144*b* and a vibration detection circuit 145*b* in place of the determination circuit 144*a* and the vibration detection circuit 145*a*, respectively. Other configurations of the wireless power transmission system 1 according to the present embodiment are the same as those of the wireless power transmission system 1 according to the first embodiment, so the same reference numerals are given to the same elements, and description will be made focusing the different points.

Like the vibration detection circuit 145*a* described in the first embodiment, the vibration detection circuit 145*b* can detect generation of the vibration signal in the resonance circuit RC and outputs the detection state signal DS indicating a state of the detection of generation of the vibration signal; however, the vibration detection circuit 145*b* differs from the vibration detection circuit 145*a* in the content of the detection state signal DS to be output. The detection state signal DS that the vibration detection circuit 145*b* outputs is a signal indicating the number of waves of the vibration signal represented by the number of times that the output voltage VO exceeds a predetermined threshold value (second threshold value TH2 to be described later).

Figure 8B:
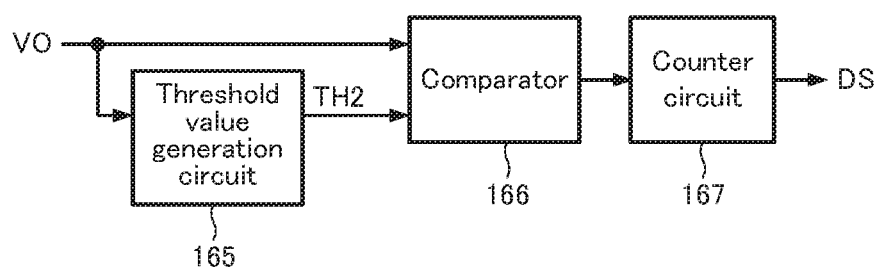
FIG. 8B is a view illustrating the internal circuit of a vibration detection circuit 145b illustrated in FIG. 8A.

FIG. 8B is a view illustrating the internal circuit of the vibration detection circuit 145*b*. As illustrated, the vibration detection circuit 145*b* includes a threshold generation circuit 165, a comparator 166, and a counter circuit 167.

The threshold generation circuit 165 is a circuit that actively generates a second threshold value TH2 according to the output voltage VO. However, the second threshold value TH2 may be a fixed value. Hereinafter, it is assumed that the second threshold value TH2 is the same fixed value as the above first threshold value TH1.

The comparator 166 compares the second threshold value TH2 generated by the threshold generation circuit 165 and the output voltage VO. When the output voltage VO exceeds the second threshold value TH2, the comparator 166 outputs High and otherwise, outputs Low.

The counter circuit 167 is a circuit that has a function of counting up for each input of High. The counter circuit 167 inputs thereto the output of the comparator 166. Therefore, the counting result of the counter circuit 167 represents the number of times that the output voltage VO exceeds the second threshold value TH2. The counting result of the counter circuit 167 is supplied to the determination circuit 144b as the detection state signal DS. The counter circuit 167 sets back the counting result to zero when a state where the input is Low continues for a predetermined time or longer.

Referring back to FIG. 8A, the determination circuit 144b differs from the determination circuit 144a according to the first embodiment in that it has a drive control part 151b in place of the drive control part 151a. Other configurations are the same as those of the determination circuit 144a, so the following description will be made focusing the points different from the determination circuit 144a.

Like the drive control part 151a according to the first embodiment, when the detection state signal DS indicates that the vibration detection circuit 145a has detected generation of the vibration signal, the drive control part 151b controls the switch drive signal SD so as to keep the switch 142 open, while when the detection state signal DS indicates that the vibration detection circuit 145a has not detected generation of the vibration signal after the previous activation of the clocking result signal TR configured to be periodically activated, the drive control part 151b controls the switch drive signal SD to close the switch 142 in response to the activation of the clocking result signal TR. However, unlike the first embodiment, the case where "the detection state signal DS indicates that the vibration detection circuit 145a has detected generation of the vibration signal" corresponds to a case where the number of waves indicated by the detection state signal DS is equal to or larger than a predetermined threshold value (third threshold value TH3 to be described later).

Further, unlike the drive control part 151a according to the first embodiment, the drive control part 151b is configured to make the foreign object detection part 150 start an operation of detecting the presence/absence of a metallic foreign object at the time when the number of waves indicated by the detection state signal DS is equal to or larger than the third threshold value TH3 in addition to the time when pulse application is ended.

Figure 9:
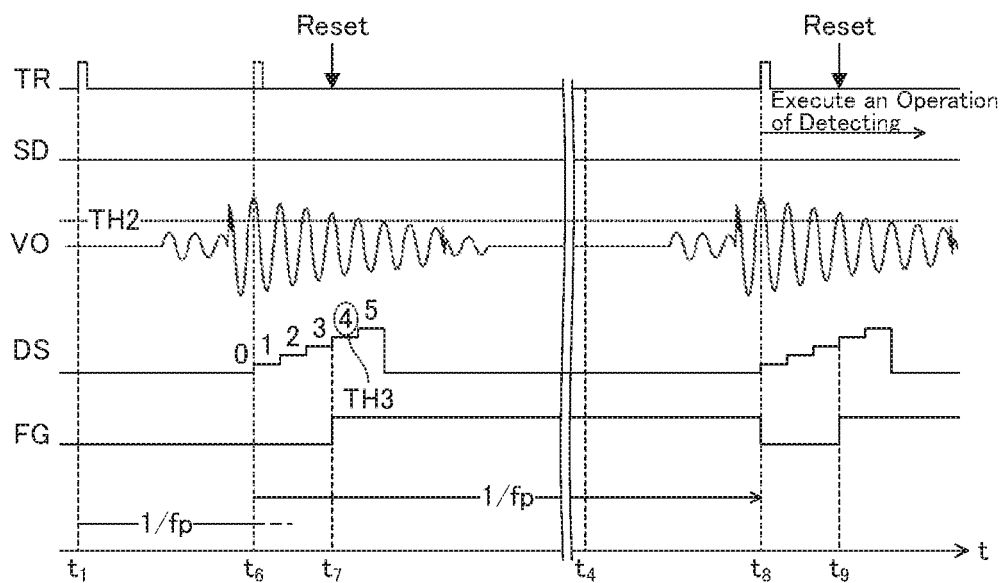
FIG. 9 is a view illustrating temporal changes in the clocking result signal TR, switch drive signal SD, output voltage VO, and detection state signal DS in the second embodiment of the present invention.

FIG. 9 is a view illustrating temporal changes in the clocking result signal TR, switch drive signal SD, output voltage VO, and detection state signal DS in the present embodiment. FIG. 9 illustrates a case where a large vibration signal is generated in the output voltage VO by switching noise of the switching circuit in the power converter 12. The temporal changes of the respective signals in a case where a large vibration signal is not generated in the output voltage VO are the same as those illustrated in FIG. 5B. Hereinafter, with reference to FIG. 9, the operation of the drive control part 151b will be described in greater detail.

After the clocking result signal TR is activated at time $t_1$, the drive control part 151a starts monitoring the detection state signal DS supplied from the vibration detection circuit 145a. Thereafter, in the example of FIG. 9, a vibration signal having an amplitude exceeding the second threshold value TH2 is generated in the output voltage VO at time $t_6$ before time $t_4$ ($=t_1+1/\text{fp}$) at which the clocking result signal TR is activated next, and the value of the detection state signal DS is incremented by one by the processing of the vibration detection circuit 145b. Assuming that the third threshold value TH3 is "4", the drive control part 151a makes the internal flag FG High in response to a state where the value of the detection state signal DS reaches "4" at time $t_7$ and thereafter resets the timer circuit 143 so as to activate the clocking result signal TR at the generation timing of the vibration signal. More specifically, the timer circuit 143 is reset so as to activate the clocking result signal TR at a period of 1/fp from time $t_6$. In a case where the cause of generation of the vibration signal is switching noise of the switching circuit in the power converter 12, the vibration signal is generated at a period of 1/fp, so that the activation timing of the clocking result signal TR and the generation timing of the vibration signal can be matched by the reset.

Thereafter, when the clocking result signal TR is activated at time $t_8$ 1/fp elapsed from time $t_6$, the drive control part 151a refers to the internal flag FG to grasp generation of an unintended vibration signal and then controls the foreign object detection part 150 to start an operation of detecting the presence/absence of a metallic foreign object. Upon receiving the control, the foreign object detection part 150 starts an operation of detecting the presence/absence of a metallic foreign object. The vibration signal used in this detection operation is generated not by the voltage Vpp (i.e., applied pulses) supplied from the drive circuit 141 to the resonance circuit RC, but by switching noise of the switching circuit in the power converter 12.

Figure 10:
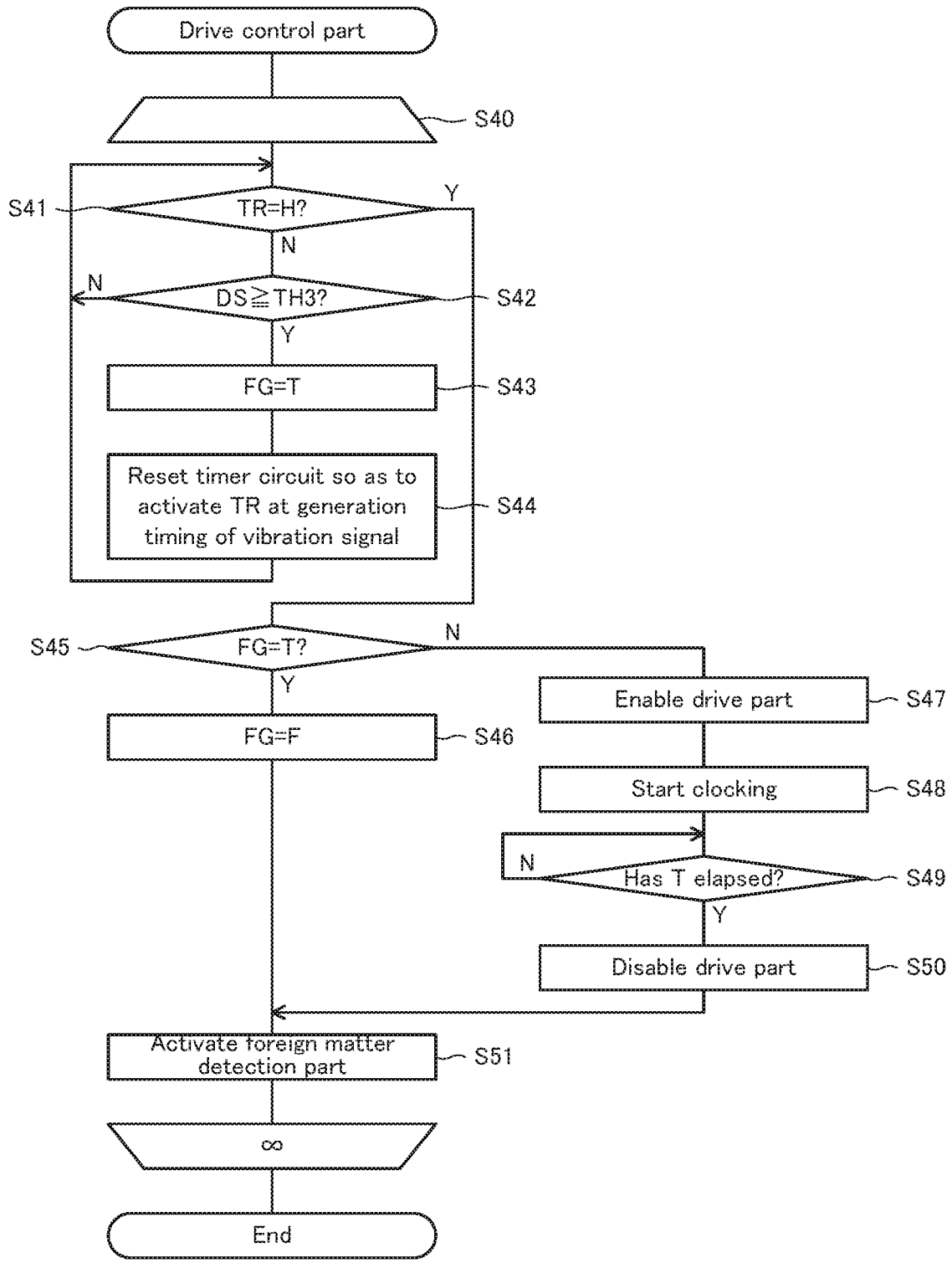
FIG. 10 is a flow chart illustrating the processing performed by a drive control part 151b illustrated in FIG. 8A.

FIG. 10 is a flow chart illustrating the processing performed by the drive control part 151b. Hereinafter, with reference to FIG. 10, the operation of the drive control part 151b will be described in greater detail.

As illustrated in FIG. 10, the drive control part 151b is configured to repeat the processing of step S41 to step S51 (step S40).

In the repetitive processing, the drive control part 151b first determines whether or not the clocking result signal TR is High (step S41). When the clocking result signal TR is not High, the drive control part 151b then determines whether or not the detection state signal DS is equal to or larger than the third threshold value TH3 (step S42). When the detection state signal DS is not smaller than the third threshold value TH3, the drive control part 151b returns to step S41 and repeats the determination of the clocking result signal TR.

When determining in step S42 that the detection state signal DS is equal to or larger than the third threshold value TH3, the drive control part 151b sets T (true) in the internal flag FG (step S43) and resets the timer circuit 143 so as to activate the clocking result signal TR at the generation timing of the vibration signal (step S44). Details of the reset processing are as described above. After resetting the timer circuit 143 in Step S44, the drive control part 151b returns to step S41.

When determining in step S41 that the clocking result signal TR is High, the drive control part 151a determines whether or not the internal flag FG is T (true) (step S45). When determining that the internal flag FG is T (true), the drive control part 151a sets F (false) in the internal flag FG (step S46) and activates the foreign object detection part 150 (step S51). As a result, the foreign object detection part 150 executes an operation of detecting the presence/absence of a metallic foreign object based on the vibration signal generated by switching noise or the like of the switching circuit in the power converter 12. After activating the foreign object detection part 150 in step S51, the drive control part 151b returns to step S41.

On the other hand, when determining in step S45 that the internal flag FG is not T (true), the drive control part 151b uses the switch drive signal SD to close the switch 142 to enable the drive circuit 141 (step S47) and starts clocking (step S48). Then, the drive control part 151*b* repeatedly determines whether or not the predetermined time T has elapsed (step S49). Then, when determining that the predetermined time T has elapsed, the drive control part 151*b* uses the switch drive signal SD to open the switch 142 to disable the drive circuit 141 (step S50) and activates the foreign object detection part 150 (step S51). As a result, the foreign object detection part 150 executes an operation of detecting the presence/absence of a metallic foreign object based on the vibration signal generated by application of the voltage Vpp. After activating the foreign object detection part 150 in step S51, the drive control part 151*b* returns to step S41.

As described above, also according to the metallic foreign object detector 14 of the present embodiment, when the vibration signal is unintentionally generated by a high-frequency component superimposed on magnetic flux generated from the feeding coil L1, the detection of a metallic foreign object can be performed using the unintentionally generated vibration signal with pulse application for intentionally generating the vibration signal stopped. This can prevent the vibration signal generated by a high-frequency component from being superimposed on the vibration signal generated in the antenna coil L3 by the applied pulse, so that it is possible to accurately detect a metallic foreign object present between the feeding coil L1 and the receiving coil L2 even during power transmission.

Further, according to the present embodiment, the detection state signal DS is used as a signal indicating the number of waves of the vibration signal represented by the number of times that the voltage appearing in the resonance circuit RC exceeds the second threshold value TH2, and the determination circuit 144*b* is configured to execute an operation of detecting the presence/absence of a metallic foreign object when the number of waves indicated by the detection state signal DS becomes equal to or larger than the third threshold value TH3, so that only when a vibration signal having an amplitude large enough to perform the metallic foreign object detection is generated, the determination circuit 144*b* is allowed to detect a metallic foreign object using the generated vibration signal.

While the preferred embodiments of the present invention have been described, the present invention is not limited to the above embodiments, and various modifications may be made within the scope of the present invention.

For example, in the above embodiments, the drive control part 151*a* (151*b*) controls the switch drive signal SD to High (applies the voltage Vpp to the resonance circuit RC) in response to activation of the clocking result signal TR only when the vibration detection circuit 145*a* (145*b*) does not detect generation of the vibration signal after the previous activation of the clocking result signal TR. However, when the wireless power transmission system 1 is in a state of stopping its operation or is carrying out low power transmission, the drive control part 151*a* (151*b*) may control the switch drive signal SD to High in response to activation of the clocking result signal TR irrespective of whether or not the vibration detection circuit 145*a* (145*b*) detects generation of the vibration signal. In this case, the drive control part 151*a* (151*b*) may receive information indicating the operation state of the wireless power transmission system 1 from the switch drive circuit 120 illustrated in FIG. 2 and determine, based on the received information, whether or not the wireless power transmission system 1 is in a state of stopping its operation or whether or not it is carrying out low power transmission. This allows the drive control part 151*a* (151*b*) to intentionally generate the vibration signal using the drive circuit 141 when a vibration signal large enough to perform the metallic foreign object detection is not generated by a high-frequency component superimposed on magnetic flux generated from the feeding coil L1 due to the operation stop of the wireless power transmission system 1 or a low power transmission state thereof.

REFERENCE SIGNS LIST

1: Wireless power transmission system
2: Load
10: Wireless power transmitting device
11: DC power supply
12: Power converter
13: Feeding coil part
14: Metallic foreign object detector
20: Wireless power receiving device
21: Receiving coil part
22: Rectifier
120: Switch drive circuit
140: Detection part
141: Drive circuit
142: Switch
143: Timer circuit
144*a*, 144*b*: Determination circuit
145*a*, 145*b*: Vibration detection circuit
150: Foreign object detection part
151*a*, 151*b*: Drive control part
160: Reset circuit
161: Peak hold circuit
165: Threshold value generation circuit
166: Comparator
167: Counter circuit
C0: Smoothing capacitor
C1: Feeding side capacitor
C2: Receiving side capacitor
C3: Capacitor
D1 to D4: Diode
DR: Control signal
DS: Detection state signal
FG: Internal flag
L1: Feeding coil
L2: Receiving coil
L3: Antenna coil
M12: Mutual inductance
RC: Resonance circuit
SD: Switch drive signal
SG1 to SG4: Control signal
SW1 to SW4: Switching element
TR: Clocking result signal
VO: Output voltage

What is claimed is:

1. A metallic foreign object detector used in a wireless power transmission system that wirelessly transmits power from a feeding coil to a receiving coil, the metallic foreign object detector comprising:
an antenna coil;
a capacitor that forms a resonance circuit together with the antenna coil;
a vibration detection circuit configured to detect generation of a vibration signal in the resonance circuit;
a determination circuit that detects a presence or absence of a metallic foreign object based on the vibration signal;
a drive circuit that applies voltage to the resonance circuit to generate the vibration signal in the resonance circuit;
a switch inserted between the drive circuit and the resonance circuit; and a timer circuit that activates a clocking result signal at a period corresponding to a frequency of an output voltage of a switching circuit that applies voltage to the feeding coil, wherein the vibration detection circuit is configured to output a detection state signal indicating a detection state of generation of the vibration signal, wherein the determination circuit is configured to execute an operation of detecting the presence or absence of a metallic foreign object according to the detection state signal, wherein the determination circuit includes a drive control part that generates a switch drive signal for controlling open or close of the switch, wherein the drive control part controls the switch drive signal so as to keep the switch open when the detection state signal indicates that the vibration detection circuit has detected generation of the vibration signal, and wherein the drive control part controls the switch drive signal so as to close the switch in response to activation of the clocking result signal when the detection state signal indicates that the vibration detection circuit has not detected generation of the vibration signal after previous activation of the clocking result signal.

2. The metallic foreign object detector as claimed in claim 1, wherein the vibration detection circuit is configured to activate the detection state signal when voltage appearing in the resonance circuit exceeds a first threshold value, and wherein the determination circuit is configured to execute the operation of detecting the presence or absence of a metallic foreign object in response to activation of the detection state signal.

3. The metallic foreign object detector as claimed in claim 2, wherein the detection state signal is a signal that indicates a number of waves of the vibration signal represented by a number of times that the voltage appearing in the resonance circuit exceeds a second threshold value, and wherein the determination circuit is configured to execute the operation of detecting the presence or absence of a metallic foreign object when the number of waves indicated by the detection state signal becomes equal to or larger than a third threshold value.

4. The metallic foreign object detector as claimed in claim 1, wherein the detection state signal is a signal that indicates a number of waves of the vibration signal represented by a number of times that the voltage appearing in the resonance circuit exceeds a second threshold value, and wherein the determination circuit is configured to execute the operation of detecting the presence or absence of a metallic foreign object when the number of waves indicated by the detection state signal becomes equal to or larger than a third threshold value.

5. The metallic foreign object detector as claimed in claim 1, wherein the drive control part controls the switch drive signal so as to close the switch when the wireless power transmission system stops its operation or performs low power transmission.

6. The metallic foreign object detector as claimed in claim 1, wherein the drive control part controls the switch drive signal so as to close the switch when the wireless power transmission system stops its operation or performs low power transmission.

7. The metallic foreign object detector as claimed in claim 1, wherein the determination circuit is configured to detect the presence or absence of a metallic foreign object based on a change in a vibration time length representing a length of time required for vibration of the vibration signal corresponding to a predetermined number of waves larger than 1.

8. A wireless power transmitting device comprising:
a feeding coil; and
the metallic foreign object detector as claimed in claim 1.

9. A wireless power receiving device comprising:
a receiving coil; and
the metallic foreign object detector as claimed in claim 1.

10. A wireless power transmission system comprising:
a wireless power transmitting device having a feeding coil; and
a wireless power receiving device having a receiving coil,
wherein at least one of the wireless power transmitting device and wireless power receiving device includes the metallic foreign object detector as claimed in claim 1.

11. A metallic foreign object detector used in a wireless power transmission system that wirelessly transmits power from a feeding coil to a receiving coil, the metallic foreign object detector comprising:
an antenna coil;
a capacitor that forms a resonance circuit together with the antenna coil;
a vibration detection circuit configured to detect generation of a vibration signal in the resonance circuit;
a determination circuit that detects a presence or absence of a metallic foreign object based on the vibration signal;
a drive circuit that applies voltage to the resonance circuit to generate the vibration signal in the resonance circuit,
a switch inserted between the drive circuit and the resonance circuit; and
a timer circuit that activates a clocking result signal at a period corresponding to a frequency of an output voltage of a switching circuit that applies voltage to the feeding coil,
wherein the vibration detection circuit is configured to output a detection state signal indicating a detection state of generation of the vibration signal,
wherein the determination circuit is configured to execute an operation of detecting the presence or absence of a metallic foreign object according to the detection state signal,
wherein the determination circuit includes a drive control part that generates a switch drive signal for controlling open or close of the switch, and
wherein the drive control part controls the switch drive signal so as to close the switch in response to activation of the clocking result signal when the detection state signal indicates that the vibration detection circuit has not detected generation of the vibration signal after previous activation of the clocking result signal.

12. A wireless power transmitting device comprising:
a feeding coil; and
the metallic foreign object detector as claimed in claim 11.

13. A wireless power receiving device comprising:
a receiving coil; and
the metallic foreign object detector as claimed in claim 11.

14. A wireless power transmission system comprising:
a wireless power transmitting device having a feeding coil; and
a wireless power receiving device having a receiving coil, wherein at least one of the wireless power transmitting device and
wireless power receiving device includes the metallic foreign object detector as claimed in claim 11.

* * * * *